(12) United States Patent
Kuo (10) Patent No.: US 9,982,792 B2
(45) Date of Patent: May 29, 2018

(54) TUBE COUPLING DEVICE HAVING VALVE MEMBER

(71) Applicant: Kuang-Ming Kuo, New Taipei (TW)

(72) Inventor: Kuang-Ming Kuo, New Taipei (TW)

( * ) Notice: Subject to any disclaimer, the term of this patent is extended or adjusted under 35 U.S.C. 154(b) by 155 days.

(21) Appl. No.: 14/883,691

(22) Filed: Oct. 15, 2015

(65) Prior Publication Data

US 2017/0037989 A1    Feb. 9, 2017

(30) Foreign Application Priority Data

Aug. 4, 2015 (TW) .............................. 104212468 U (51) Int. Cl.
| | |
|---|---|
| *F16L 29/00* | (2006.01) |
| *F16K 15/02* | (2006.01) |
| *E03C 1/00* | (2006.01) |
| *F16L 15/00* | (2006.01) |
| *F16K 24/06* | (2006.01) |

(52) U.S. Cl.
CPC ................ *F16K 15/02* (2013.01); *E03C 1/00* (2013.01); *F16K 15/026* (2013.01); *F16K 24/06* (2013.01); *F16L 15/007* (2013.01); *F16L 29/00* (2013.01)

(58) Field of Classification Search
CPC ......... F16L 29/00; F16L 15/007; F16K 15/02; F16K 15/026; F16K 24/06; E03C 1/00

USPC ................................................. 137/515, 217
See application file for complete search history.

(56) References Cited

U.S. PATENT DOCUMENTS

| 2,649,277 | A | * | 8/1953 | Blackford ............. F16K 15/028 |
| | | | | 137/454.5 |
| 3,552,426 | A | * | 1/1971 | Hester ..................... F16K 24/06 |
| | | | | 137/375 |
| 8,245,721 | B2 | * | 8/2012 | Kuo .......................... E03B 7/10 |
| | | | | 137/217 |

* cited by examiner

*Primary Examiner* — Craig Schneider
*Assistant Examiner* — P. Macade Nichols
(74) *Attorney, Agent, or Firm* — Rosenberg, Klein & Lee (57) ABSTRACT

A tube coupling device having a check valve contains: a coupling body and a valve assembly. The coupling body includes a tubular member and a circular connecting seat, the tubular member is hollow to flow water, and the coupling body also includes an isolation sleeve for covering on an inner wall of the tubular member, such that the isolation sleeve separates the water from the tubular member, and the isolation sleeve has a flow channel for flowing the water. The locking set is disposed between the tubular member and the isolation sleeve and includes a protruded rib extending inwardly around the tubular member and retained between the isolation sleeve and the tubular member. The locking set also includes a retaining groove formed on the isolation sleeve and retaining with the protruded rib, and the retaining groove engages with the protruded rib and covers three sides of the protruded rib.

12 Claims, 6 Drawing Sheets

TUBE COUPLING DEVICE HAVING VALVE MEMBER

FIELD OF THE INVENTION

The present invention relates to a tube coupling device having a valve member in which water does not contact a metal portion of a tubular member, thus enhancing isolation effect.

BACKGROUND OF THE INVENTION

A conventional tube coupling device is applied to connect a water supply unit and a water tube together. However, a back pressure produces in the water tube as water stops flowing in the water tube, thus producing bacterium because maintaining the water in the water tube.

A tube coupling device having a check valve is disclosed in U.S. Pat. No. 8,245,721 and includes a coupling member having an upper peripheral casing formed by a peripheral flange and a peripheral wall, a number of openings formed in the peripheral flange and communicative with an environment of the peripheral casing, a water guide plate engaged into the peripheral fence and engaged with the peripheral wall and having one or more passages, a partition member engaged into the peripheral casing and having a bore for water to flow into the coupling member, and a receptacle engaged into the coupling member, a valve member biased by a spring biasing member to engage with the partition member and to form a check valve.

Another tube coupling device having a check valve is disclosed in TW 101216457 and contains a coupling body which includes a large-diameter hole and a small-diameter hole fitting with a resilient element and a check valve, wherein the large-diameter hole has a peripheral groove retained with a stop pad. The coupling body further includes a connector having a guiding plate and connecting with a faucet. The guiding plate has an inlet to guide water to push the check valve, such that the water flows out of the coupling body through a coupling opening. After stopping water supply, the resilient element pushes the check valve upwardly, so that the stop pad is pushed by the check valve to contact the guiding plate, and the small-diameter hole has an orifice communicating with air opening. The peripheral groove of the large-diameter hole has a shoulder defined therein to contact with the guiding plate, such that a plastic gasket fits with the guiding plate, and the small-diameter hole has a fitting sleeve, wherein the stop pad, the gasket, and the fitting sleeve stop water contacting a metal portion of the coupling body.

Another tube coupling device having a check valve is disclosed in TW 102207943 and contains a coupling body and a valve assembly, wherein the valve assembly includes: a check valves with plural wings, a resilient element fitting with the check valve, and a fitting sleeve for accommodating the check valve and the resilient element. The fitting sleeve has plural anti-slip portions, a fourth vertical section, a first lateral section, and a second vertical section perpendicular to a first lateral section, wherein the second vertical section extends to a second lateral section, and a third vertical section extends from a distal end of the second lateral section, a first vertical section extends from the first lateral section, and a diameter defined by the third vertical section is greater than an outer diameter defined by the wings of the check valve. The tube coupling device further contains a valve member which includes a first neck portion for accommodating the check valve and includes a second neck portion, wherein the second neck portion has an inner stop rib and a stepped rim, the first neck portion has a first zone corresponding to the fourth vertical section and the anti-slip portion, and the first zone has at least one recess retaining with the anti-slip portion and has an anti-slip patterns.

The present invention has arisen to mitigate and/or obviate the afore-described disadvantages.

SUMMARY OF THE INVENTION

The primary objective of the present invention is to provide a tube coupling device having a valve member in which water does not contact a metal portion of a tubular member, thus enhancing isolation effect.

Further objective of the present invention is to provide a tube coupling device having a valve member in which a locking set is disposed between the tubular member and an isolation sleeve so as to increase a contacting area between the isolation sleeve and the tubular member and to fix the tubular member and the isolation sleeve securely.

Another objective of the present invention is to provide a tube coupling device having a valve member which when the isolation sleeve causes a using fatigue to form a slit between the isolation sleeve and the tubular member, the isolation sleeve will not remove from the tubular member by engaging the protruded rib with the retaining groove firmly, and the solation sleeve will not move upwardly to block the air conduit.

To obtain the above objectives, a tube coupling device having a valve member provided by the present invention contains: a coupling body and a valve assembly accommodated in the coupling body.

The coupling body includes a tubular member and a circular connecting seat connected with the tubular member, the tubular member is hollow so as to flow water, and the coupling body also includes an isolation sleeve mounted on a predetermined portion of an inner wall thereof to cover on an inner wall of the tubular member, such that the isolation sleeve separates the water from the inner wall of the tubular member, and the isolation sleeve has a flow channel defined therein so as to flow the water.

A locking set is disposed between the tubular member and the isolation sleeve, and the locking set includes a protruded rib extending inwardly around a bottom of the tubular member and retained between the isolation sleeve and the tubular member; the locking set also includes a retaining groove formed on the isolation sleeve and corresponding to the protruded rib, and the retaining groove engages with the protruded rib and covers three sides of the protruded rib.

DETAILED DESCRIPTION OF THE
PREFERRED EMBODIMENTS

Figure 1:
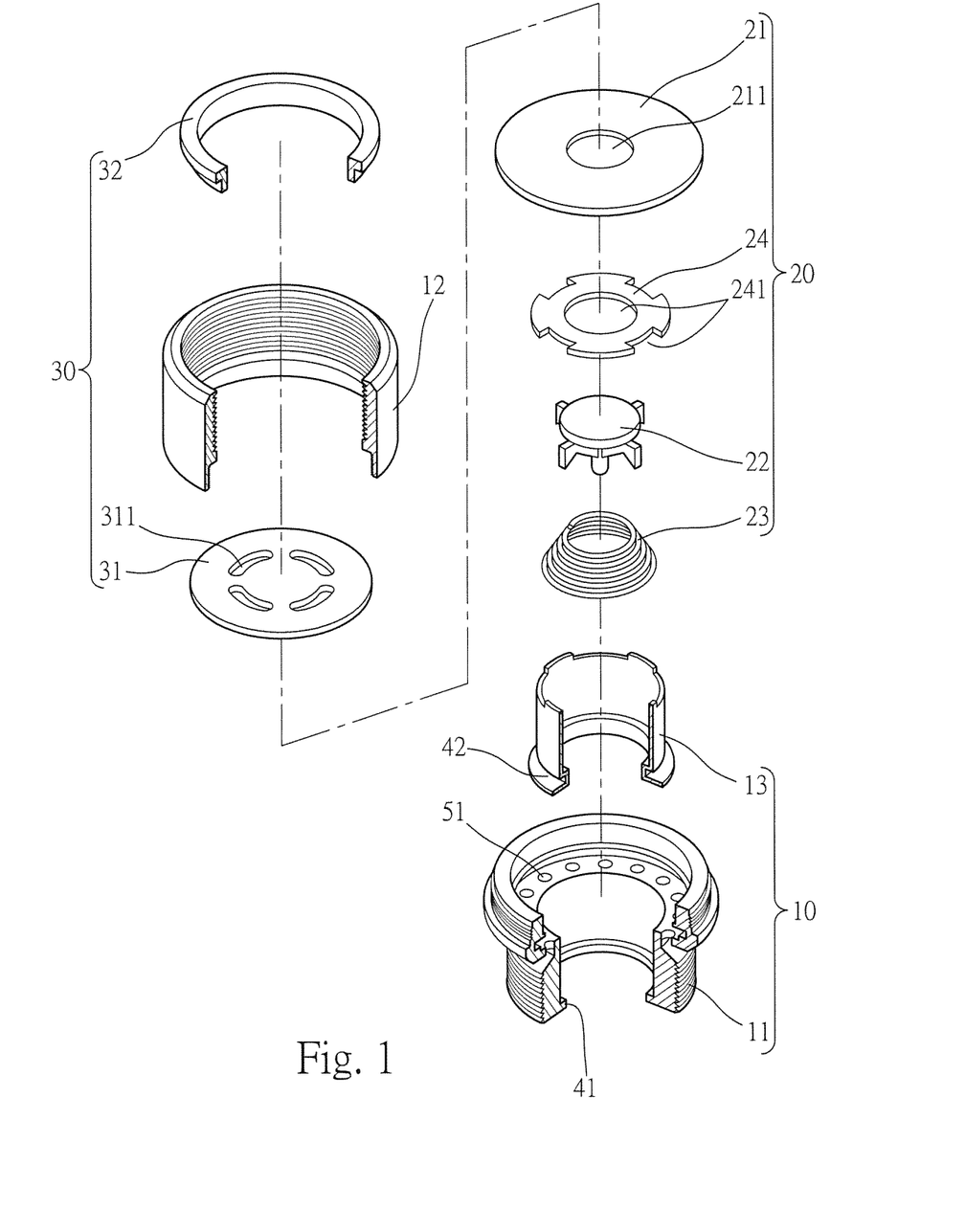
FIG. 1 is a perspective view showing the exploded components of a tube coupling device having a check valve according to a first embodiment of the present invention.
Figure 2:
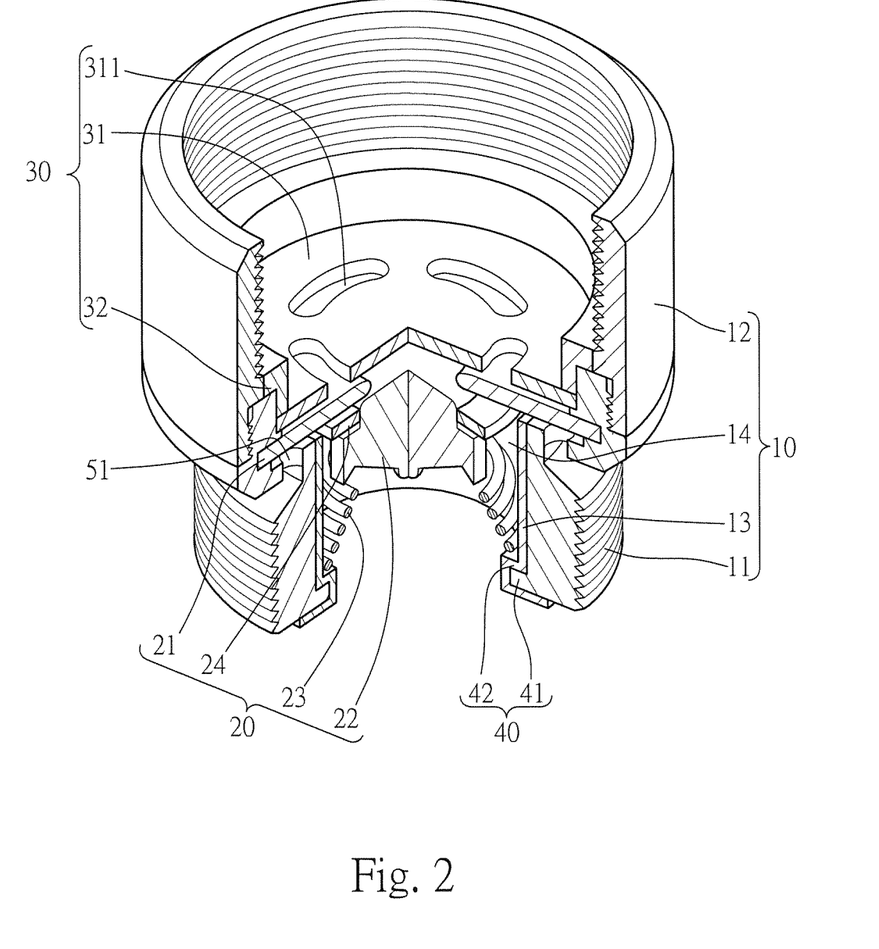
FIG. 2 is a cross-sectional perspective view showing the assembly of a part of the tube coupling device having the check valve according to the first embodiment of the present invention.
Figure 3:
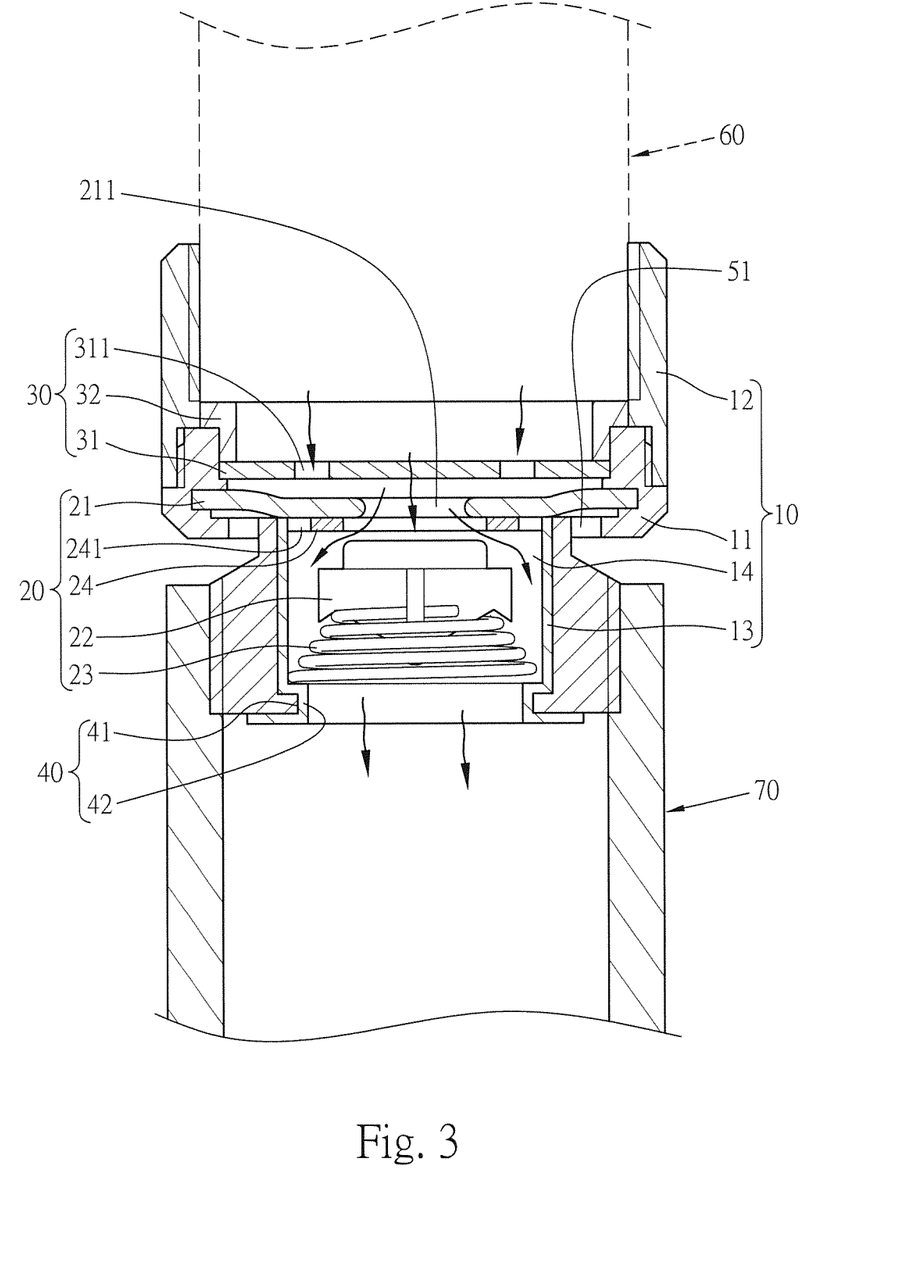
FIG. 3 is a cross-sectional view showing the assembly of the tube coupling device having the check valve according to the first embodiment of the present invention.

With reference to FIGS. 1 to 3, a tube coupling device having a check valve in accordance with a first embodiment of the present invention comprises a cylindrical coupling body 10, a valve assembly 20 accommodated in the coupling body 10, an inlet assembly 30, a locking set 40, and an air conduit 50 defined between the coupling body 10 and the valve assembly 20.

The coupling body 10 includes a tubular member 11 and a circular connecting seat 12 connected with the tubular member 11, wherein the tubular member 11 is hollow so as to flow water; the connecting seat 12 fits with a water supply unit 60, such as a water pipe or a faucet; an isolation sleeve 13 mounted on a predetermined portion of an inner wall of the coupling body 10, wherein the isolation sleeve 13 covers on an inner wall of the tubular member 11 to separate the water from the inner wall of the tubular member 11, and the isolation sleeve 13 has a flow channel 14 defined therein so as to flow water.

The valve assembly 20 includes: a gasket 21 fixed in the coupling body 10 to separate an upper chamber of the coupling body 10 from a lower chamber of the coupling body 10, wherein the gasket 21 is made of plastic material and has an aperture 211 defined on a central position thereof; a valve member 22 mounted between and moving along the upper chamber and the lower chamber of the coupling body 10, wherein one end of the valve member 22 abuts against the gasket 21; a resilient element 23 disposed between the valve member 22 and the isolation sleeve 13 and its first end pushing the valve member 22 to move toward the aperture 211; a limiting element 24 being circular and mounted between the gasket 21 and the valve member 22, wherein the limiting element 24 has at least one hollow portion 241 to flow the water, a top of the limiting element 24 limits a curved deformation of the gasket 21 at a water pressure, and a bottom of the limiting element 24 confines a movement of the valve member 22 to the aperture 211.

The inlet assembly 30 is fixed above the valve assembly 20 and includes a guiding plate 31 spaced a distance from the gasket 21; the guiding plate 31 has at least one opening 311; a positioning element 32 which is circular and is secured on the guiding plate 31, wherein one end of the positioning element 32 contacts with the guiding plate 31 and retains with the inner wall of the coupling body 10, such that the guiding plate 31 is positioned in the coupling body 10.

The locking set 40 is disposed between the tubular member 11 and the isolation sleeve 13 and includes a protruded rib 41 extending inwardly around a bottom of the tubular member 11 and retained between the isolation sleeve 13 and the tubular member 11; the locking set 40 also includes a retaining groove 42 formed on the isolation sleeve 13 and corresponding to the protruded rib 41, such that the retaining groove 42 engages with the protruded rib 41; the locking set 40 further includes a shoulder arranged in the isolation sleeve 13 to abut against a second end of the resilient element 23.

The air conduit 50 is located below the gasket 21 and includes at least one air orifice 51 communicating with the tubular member 11; wherein the at least one air orifice 51 of the air conduit 50 is also in communication with the flow channel 14.

Thereby, the isolation sleeve 13 contacts with the gasket 21 and connects with the protruded rib 41 of the tubular member 11 by using its retaining groove 42 to enhance water isolation and to fix the tube coupling device securely.

Before assembling tube coupling device, the at least one air orifice 51 is integrally molded on the protruded rib 41 of the tubular member 11; and the retaining groove 42 is integrally molded on the isolation sleeve 13; the at least one opening 311 is integrally molded on the guiding plate 31; the aperture 211 is integrally molded on the gasket 21; and the at least one hollow portion 241 is integrally molded on the limiting element 24.

In assembly, the isolation sleeve 13 is positioned on the inner wall of the tubular member 11 so that the protruded rib 41 engages with the retaining groove 42, and the resilient element 23, the valve member 22, and the limiting element 24 are mounted in the tubular member 11 in turn, such that the limiting element 24 retains with the inner wall of the tubular member 11, the second end of the resilient element 23 abuts against the shoulder of the locking set 40, and the first end of the resilient element 23 contacts with the valve member 22, wherein a central portion of the valve member 22 extends out of the hollow portion 241 of the limiting element 24, and the valve member 22 contacts with the limiting element 24. Thereafter, the gasket 21 is fixed in the tubular member 11, such that a gap between the gasket 21 and the limiting element 24 forms in the air conduit 50. The guiding plate 31 and the positioning element 32 are fixed in the tubular member 11, wherein the guiding plate 31 is spaced a distance from the gasket 21. Finally, the connecting seat 12 is screwed with the tubular member 11.

In operation, the tubular member 11 is in connection with a water tube 70, and the connecting seat 12 is coupled with the water supply unit 60, wherein the water supply unit 60 is the faucet or the water pipe, so as shown in FIG. 3, when the water flows into the aperture 211 from the water supply unit 60 via the positioning element 32 and the at least one opening 311, the valve member 22 is pushed by the water pressure to move away from the hollow portion 241 so as to form the gap through which the water flows into the flow channel 14, thereafter the water flows into the water tube 70. It is noted that when the water flows downwardly in the coupling body 10, the gasket moves close to the aperture and is pushed by the water pressure to curve downwardly, such that the gasket 21 blocks the air conduit 50, thus flowing the water smoothly.

Figure 4:
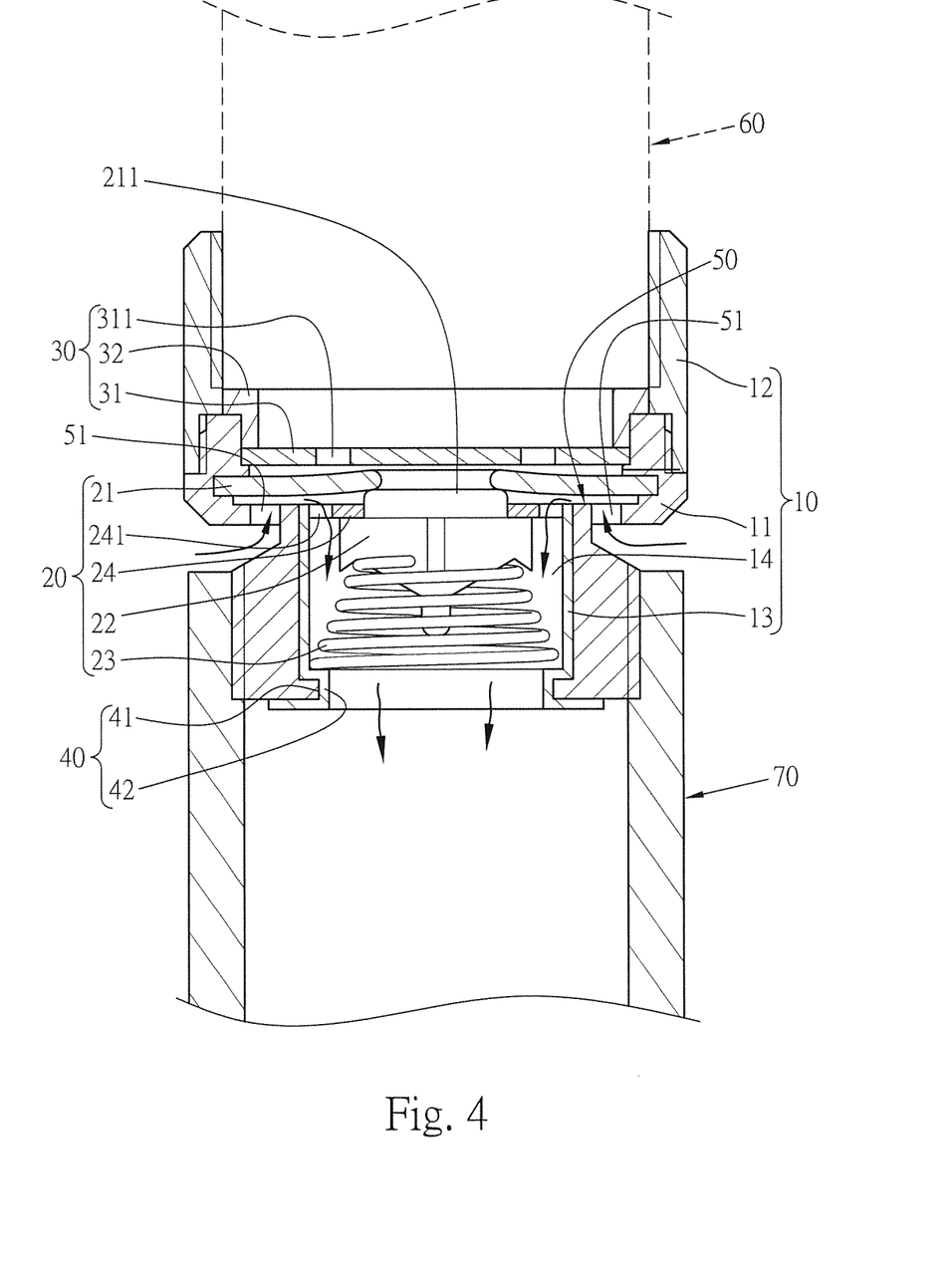
FIG. 4 is a cross-sectional view showing the operation of the tube coupling device having the check valve according to the first embodiment of the present invention.

Referring to FIG. 4, when the water supply unit 60 stops supplying the water, the valve member 22 is not pushed by the water pressure but is pushed by the resilient element 23 to move toward the aperture 211 until the valve member 22 contacts with the limiting element 24, wherein a top of the valve member 22 pushes the gasket 21 so that the gasket 21 curves upwardly, such that the at least one air orifice 51 of the air conduit 50 is in communication with the flow channel 14 so as to flow the water.

Figure 5:
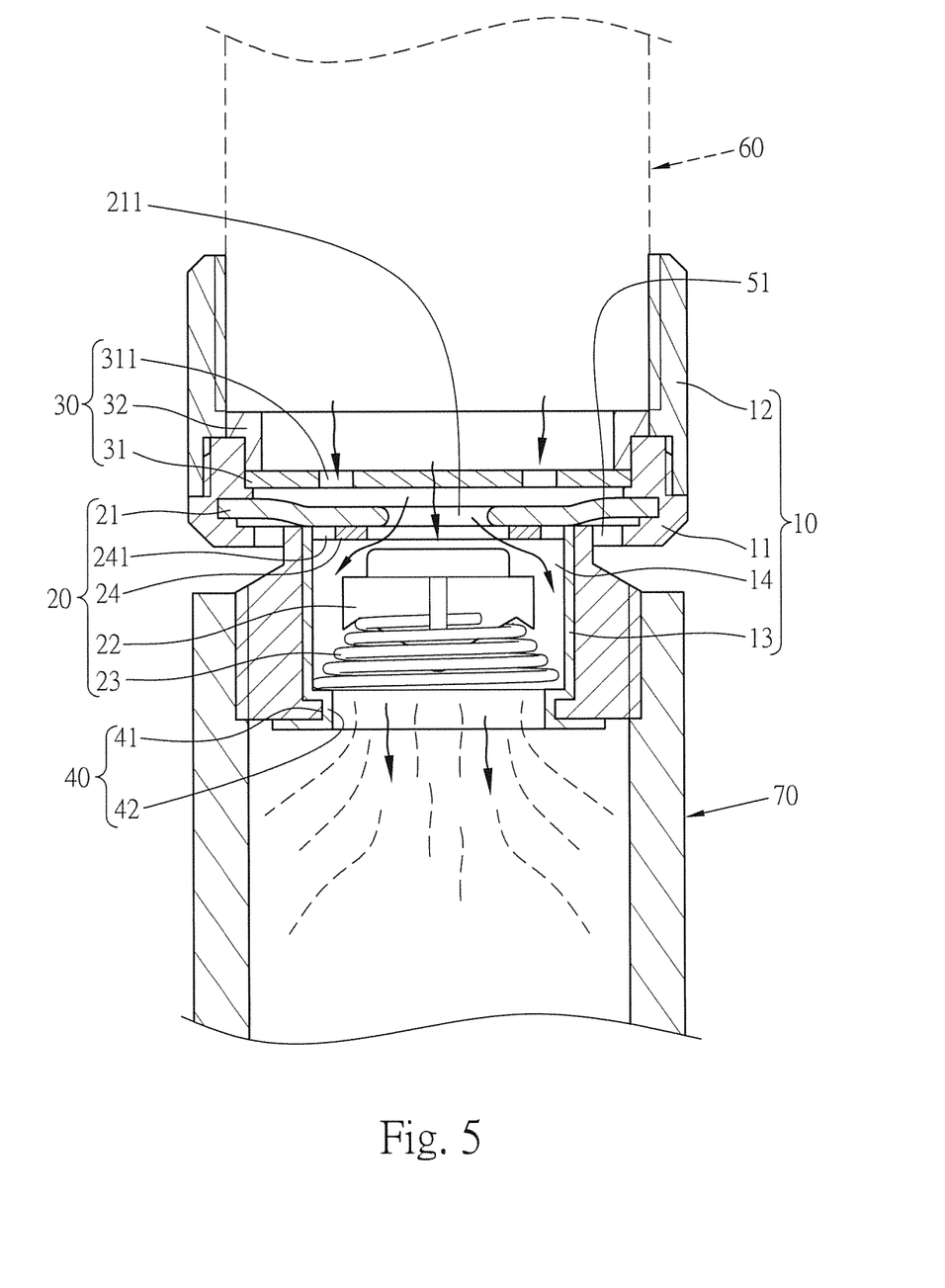
FIG. 5 is another cross-sectional view showing the operation of the tube coupling device having the check valve according to the first embodiment of the present invention.

With reference to FIG. 5, the retaining groove 42 is defined by three sides of the isolation sleeve 13 to completely cover three sides of the protruded rib 41, and the other side of the isolation sleeve 13 extends outwardly to the gasket 21, such that the isolation sleeve 13 covers the tubular member 11 so that when the water flows through/between the flow channel 14 and the water tube 70, it does not contact a metal portion of the tubular member 11, thus enhancing isolation effect.

The locking set 40 is disposed between the tubular member 11 and the isolation sleeve 13 so as to increase a contacting area between the isolation sleeve 13 and the tubular member 11 and to fix the tubular member 11 and the isolation sleeve 13 securely.

Preferably, when the isolation sleeve 13 causes a using fatigue, such as inward deformation or hydrolysis to form a slit between the isolation sleeve 13 and the tubular member 11, the isolation sleeve 13 will not remove from the tubular member 11 by engaging the protruded rib 41 with the retaining groove 42 firmly, and the solation sleeve 13 will not move upwardly to block the air conduit 50.

Figure 6:
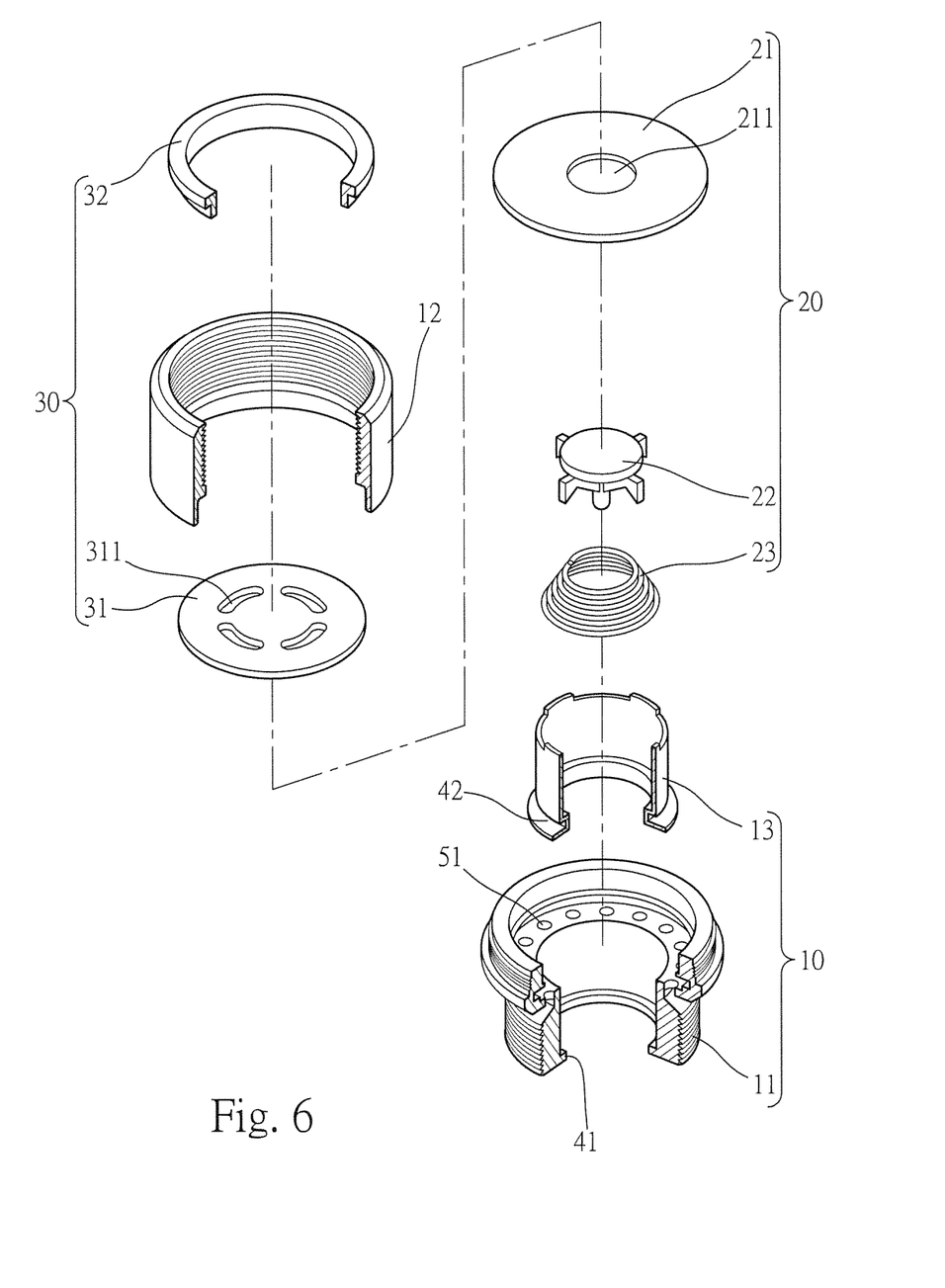
FIG. 6 is a perspective view showing the exploded components of a tube coupling device having a check valve according to a second embodiment of the present invention.

As shown in FIG. 6, a tube coupling device having a check valve according to a second embodiment of the present invention comprises a valve assembly 20 including: a gasket 21 fixed in a coupling body 10, wherein the gasket 21 separates an upper chamber of the coupling body 10 from a lower chamber of the coupling body 10, and the gasket 21 is made of plastic material and has an aperture 211 defined on a central position thereof; a valve member 22 mounted and moving in the lower chamber of the coupling body 10, wherein one end of the valve member 22 abuts against the gasket 21; and a resilient element 23 disposed between the valve member 22 and an isolation sleeve 13, such that the resilient element 23 pushes the valve member 22 to move toward the aperture 211. In other words, the limiting element 24 of the first embodiment is eliminated in this embodiment.

Accordingly, the isolation sleeve covers the tubular member so that when the water flows through/between the flow channel and the water tube, it does not contact the metal portion of the tubular member, thus enhancing isolation effect. Preferably, the locking set is disposed between the tubular member and the isolation sleeve so as to increase a contacting area between the isolation sleeve and the tubular member and to fix the tubular member and the isolation sleeve securely. Thus, when the isolation sleeve causes the using fatigue to form the slit between the isolation sleeve and the tubular member, the isolation sleeve will not remove from the tubular member by engaging the protruded rib with the retaining groove securely, and the solation sleeve will not move upwardly to block the air conduit.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A tube coupling device having a check valve comprising:
 a coupling body and a valve assembly accommodated in the coupling body; the coupling body including a tubular member and a circular connecting seat connected with the tubular member, the tubular member being hollow to pass a flow of water therethrough, the coupling body further including an isolation sleeve mounted to cover an inner wall of the tubular member, the isolation sleeve extending along the inner wall to an outer terminal end of the tubular member for separating the water therefrom, the isolation sleeve having a flow channel defined therein to guide the flow of water;
 wherein a locking set is defined between the tubular member and the isolation sleeve, the locking set being defined to include a protruded rib extending inwardly from a bottom of the tubular member to extend to the isolation sleeve; the locking set-being defined to further include a retaining groove formed on the isolation sleeve and corresponding to the protruded rib, and the retaining groove being engaged with the protruded rib and covering three sides of the protruded rib;
 wherein the valve assembly includes: a gasket fixed in the coupling body to separate an upper chamber of the coupling body from a lower chamber of the coupling body, wherein the gasket has an aperture defined on a central position thereof; a valve member mounted and moving in the lower chamber of the coupling body, wherein one end of the valve member abuts against the gasket; a shoulder arranged in the isolation sleeve; and a resilient element disposed between the valve member and the isolation sleeve and pushing the valve member to move toward the aperture.

2. The tube coupling device having the check valve as claimed in claim 1, wherein the valve assembly further includes a circular limiting element mounted between the gasket and the valve member, wherein the limiting element has at least one hollow portion to pass a flow of water, a top of the limiting element limits a curved deformation of the gasket at a water pressure, and a bottom of the limiting element confines a movement of the valve member to the aperture.

3. A tube coupling device having a check valve comprising:
 a coupling body and a valve assembly accommodated in the coupling body; the coupling body including a tubular member and a circular connecting seat connected with the tubular member, the tubular member being hollow to pass a flow of water, the coupling body further including an isolation sleeve mounted on a predetermined portion of an inner wall of the tubular member to cover the inner wall, the isolation sleeve thereby separating the water from the inner wall of the tubular member, the isolation sleeve having a flow channel defined therein to pass a flow of water;
 wherein a locking set is defined between the tubular member and the isolation sleeve, the locking set being defined to include a protruded rib extending inwardly from a bottom of the tubular member to extend to the isolation sleeve; the locking set being defined to further include a retaining groove formed on the isolation sleeve and corresponding to the protruded rib, the retaining groove being engaged with the protruded rib and covering three sides of the protruded rib;
 wherein the valve assembly includes: a gasket fixed in the coupling body to separate an upper chamber of the coupling body from a lower chamber of the coupling body, wherein the gasket has an aperture defined on a central position thereof; a valve member mounted and moving in the lower chamber of the coupling body, wherein one end of the valve member abuts against the gasket; a shoulder arranged in the isolation sleeve; and a resilient element disposed between the valve member and the isolation sleeve and pushing the valve member to move toward the aperture.

4. The tube coupling device having the check valve as claimed in claim 3, wherein the valve assembly further includes a circular limiting element mounted between the gasket and the valve member, wherein the limiting element has at least one hollow portion to pass a flow of water, a top of the limiting element limits a curved deformation of the gasket at a water pressure, and a bottom of the limiting element confines a movement of the valve member to the aperture.

5. A tube coupling device having a check valve comprising:
   a coupling body and a valve assembly accommodated in the coupling body; the coupling body including a tubular member and a circular connecting seat connected with the tubular member, the tubular member being hollow to pass a flow of water, the coupling body further including an isolation sleeve mounted on a predetermined portion of an inner wall of the tubular member to cover the inner wall, the isolation sleeve thereby separating the water from the inner wall of the tubular member, the isolation sleeve having a flow channel defined therein to pass a flow of water;
   wherein a locking set is defined between the tubular member and the isolation sleeve, the locking set being defined to include a protruded rib extending inwardly from a bottom of the tubular member to extend to the isolation sleeve; the locking set being defined to further include a retaining groove formed on the isolation sleeve and corresponding to the protruded rib, the retaining groove being engaged with the protruded rib and covering three sides of the protruded rib;
   wherein the coupling body further includes a gasket and an inlet assembly fixed above the valve assembly, and the inlet assembly includes a guiding plate spaced a distance from the gasket; the guiding plate has at least one opening.

6. The tube coupling device having the check valve as claimed in claim 5, wherein the inlet assembly further includes a positioning element which is circular and is secured on the guiding plate, wherein one end of the positioning element contacts and retains the guiding plate within an inner surface of the coupling body, such that the guiding plate is positioned in the coupling body.

7. A tube coupling device having a check valve comprising:
   a coupling body and a valve assembly accommodated in the coupling body; the coupling body including a tubular member and a circular connecting seat connected with the tubular member, the tubular member being hollow to pass a flow of water, the coupling body further including an isolation sleeve mounted on a predetermined portion of an inner wall of the tubular member to cover the inner wall, the isolation sleeve thereby separating the water from the inner wall of the tubular member, the isolation sleeve having a flow channel defined therein to pass a flow of water;
   wherein a locking set is defined between the tubular member and the isolation sleeve, the locking set being defined to include a protruded rib extending inwardly from a bottom of the tubular member to extend to the isolation sleeve; the locking set being defined to further include a retaining groove formed on the isolation sleeve and corresponding to the protruded rib, the retaining groove being engaged with the protruded rib and covering three sides of the protruded rib;
   wherein the coupling body further includes a gasket and an air conduit defined therein to be located below the gasket, and the air conduit includes at least one air orifice communicating with the tubular member and the flow channel.

8. The tube coupling device having the check valve as claimed in claim 7, wherein the gasket is made of plastic material, and when the water flows downwardly in the coupling body, the gasket moves close to the aperture and is pushed by the water pressure to curved downwardly; and when the water stops flowing, the valve member is pushed by the resilient element so that the gasket curves upwardly.

9. A tube coupling device having a check valve comprising:
   a coupling body and a valve assembly accommodated in the coupling body; the coupling body including a tubular member and a circular connecting seat connected with the tubular member, the tubular member being hollow to pass a flow of water therethrough, the coupling body further including an isolation sleeve mounted to cover an inner wall of the tubular member, the isolation sleeve extending along the inner wall to an outer terminal end of the tubular member for separating the water therefrom, the isolation sleeve having a flow channel defined therein to guide the flow of water;
   wherein a locking set is defined between the tubular member and the isolation sleeve, the locking set being defined to include a protruded rib extending inwardly from a bottom of the tubular member to extend to the isolation sleeve; the locking set-being defined to further include a retaining groove formed on the isolation sleeve and corresponding to the protruded rib, and the retaining groove being engaged with the protruded rib and covering three sides of the protruded rib;
   wherein the coupling body further includes a gasket and an inlet assembly fixed above the valve assembly, and the inlet assembly includes a guiding plate spaced a distance from the gasket; the guiding plate has at least one opening.

10. The tube coupling device having the check valve as claimed in claim 9, wherein the inlet assembly further includes a positioning element which is circular and is secured on the guiding plate, wherein one end of the positioning element contacts and retains the guiding plate within an inner surface of the coupling body, such that the guiding plate is positioned in the coupling body.

11. A tube coupling device having a check valve comprising:
   a coupling body and a valve assembly accommodated in the coupling body; the coupling body including a tubular member and a circular connecting seat connected with the tubular member, the tubular member being hollow to pass a flow of water therethrough, the coupling body further including an isolation sleeve mounted to cover an inner wall of the tubular member, the isolation sleeve extending along the inner wall to an outer terminal end of the tubular member for separating the water therefrom, the isolation sleeve having a flow channel defined therein to guide the flow of water;
   wherein a locking set is defined between the tubular member and the isolation sleeve, the locking set being defined to include a protruded rib extending inwardly from a bottom of the tubular member to extend to the isolation sleeve; the locking set-being defined to further include a retaining groove formed on the isolation sleeve and corresponding to the protruded rib, and the retaining groove being engaged with the protruded rib and covering three sides of the protruded rib;
   wherein the coupling body further includes a gasket and an air conduit defined therein to be located below the gasket, and the air conduit includes at least one air orifice communicating with the tubular member and the flow channel.

12. The tube coupling device having the check valve as claimed in claim 11, wherein the gasket is made of plastic material, and when the water flows downwardly in the coupling body, the gasket moves close to the aperture and is pushed by the water pressure to curved downwardly; and when the water stops flowing, the valve member is pushed by the resilient element so that the gasket curves upwardly.

* * * * *